Feb. 18, 1958        R. C. KALEY        2,823,711
ADJUSTABLE SPLITTER BLADE ASSEMBLY FOR SAWS
Filed Oct. 27, 1955
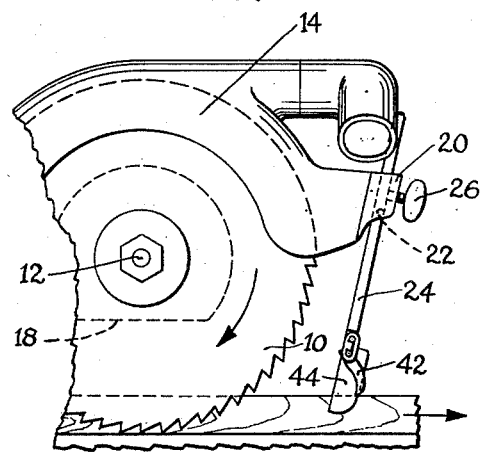
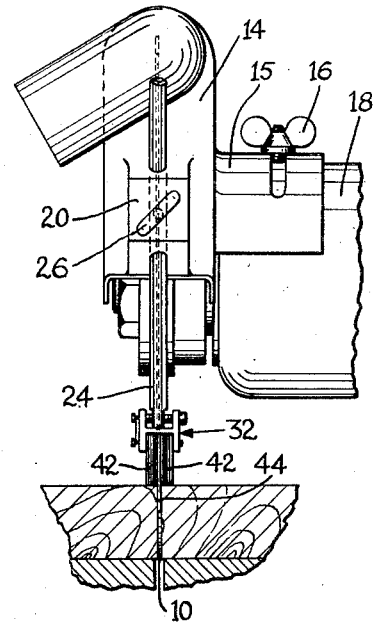
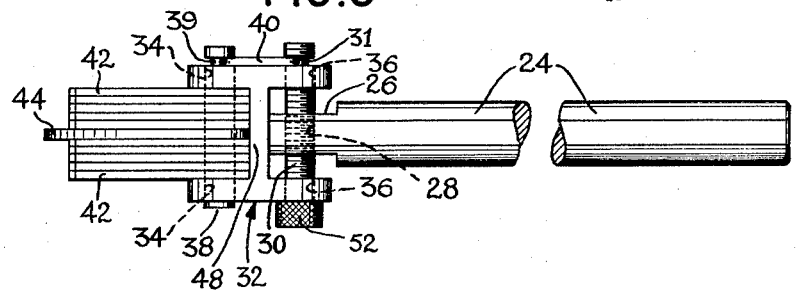
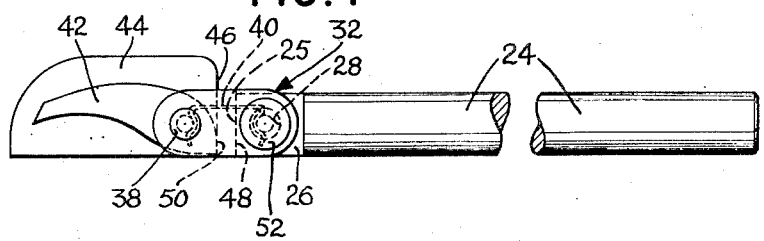
INVENTOR
ROBERT C. KALEY
BY *Bradley Cohn*
ATTORNEY United States Patent Office 2,823,711
Patented Feb. 18, 1958

2,823,711

ADJUSTABLE SPLITTER BLADE ASSEMBLY FOR SAWS

Robert C. Kaley, Landisville, Pa., assignor to De Walt Inc., a corporation of Pennsylvania Application October 27, 1955, Serial No. 543,076

6 Claims. (Cl. 143—159)

This invention relates to attachments for power saws and more particularly it relates to an adjustable splitter and anti-kickback structure of the type shown in U. S. patent to Knapp 1,888,679 dated November 22, 1932.

It is necessary in this type of structure for the splitter blade to follow in the saw cut. The saw blade normally abuts against a shoulder on the driven shaft to which it is secured. Thin or hollow ground saw blades will have their center line slightly closer the shoulder than will a thicker or plane saw blade. Also some saw blades require special mounting means which may offset their center line. Accordingly, it is usually necessary to re-locate the splitter blade for each saw blade. Therefore, it is an object of the invention to provide a simplified structure for quick lateral adjustment of the splitter blade to bring it in line with the saw blade and saw cut.

It is an object of this invention to provide a single adjustable bracket supporting the kickback dogs and the splitter blade.

It is a further object of the invention to provide a unitary adjustment means for quick adjustment of the splitter blade.

The invention also provides for greater sidewise adjustment than has been heretofore obtainable.

It is still another object of the invention to provide an adjustable unitary bracket secured to a single supporting member and carrying an assembly of splitter blade and kickback dogs.

It is a further object of the invention to provide a unitary adjustment means for a splitter blade.

The novel features which I believe to be characteristic of my invention are set forth with particularity in the appended claims. My invention itself, however, both as to its organization and method of operation may be understood by reference to the following description taken in connection with the accompanying drawings, in which:

Fig. 1 is a side elevation of the invention in operative position with a guarded rotary saw;

Fig. 2 is a rear elevation of the same;

Fig. 3 is an enlarged plan view showing of my adjustable splitter blade and kickback bracket; and Fig. 4 is a side elevation of the same.

In Figs. 1 and 2, I show a circular saw blade 10 suitably mounted to a driven rotating shaft 12. A guard 14, mounted about the upper periphery of the saw blade, has a flange 15 which is secured to motor housing 18 by means of a suitable thumb screw 16. A lug 20 extending from the guard 14 has a bore 22 to receive the splitter and kickback support rod 24. A thumb screw 26 secures rod 24 in any vertically adjusted position in bore 22 of lug 20. The lower end of the rod 24 has a reduced portion 26 with a threaded bore 28 to receive a threaded stud 30.

An H-shaped bracket 32 is provided with a pair of bores 34 and a pair of bores 36. A pin 38 is supported in the bores 34 while the threaded stud 30 is supported in the bores 36. Spring lock 40 engages annular grooves 39 and 31 formed respectively in pin 38 and threaded stud 30 to retain these members against longitudinal movement in the bores 34 and 36, respectively.

The kickback dogs 42 and the splitter blade 44 are pivoted on stud pin 38. The splitter blade 44 is formed with a flat edge 46 engaging the cross member 48 of H-shaped bracket 32 and is thereby prevented from rotating on stud pin 38. The kickback dogs are shaped to rotate upwardly as shown in Fig. 4 and have a cam surface the high point 50 of which engages cross bar 48 to limit their counter-clockwise rotation to the position shown in Fig. 4.

The threaded stud 30 has a knurled head 52 to facilitate rotation for lateral adjustment of the bracket 32 on shaft 24. Threaded stud 30, of course, is smooth or un-threaded along the portion bearing in the bores 36. Since it is threaded to the reduced portion 26 of shaft 24, rotation of threaded stud 30 will move H-shaped bracket 32 laterally with respect to shaft 24. It should be noted that rotation of H-shaped bracket 32 about threaded stud 30 is prevented by engagement of the flat end face 25 of shaft 24 with the cross bar 48 of bracket 32. The engagement of end face 25 with cross bar 48, however, permits lateral adjustment. The kickback dogs 42 and splitter blade 44 move laterally with the bracket 32 when it is adjusted relative to shaft 24. It is therefore evident that while the kickback dogs 42 and the splitter blade 44 are securely held by the bracket 32 the whole assembly is readily adjustable on the single adjustment member, the threaded stud 30.

I claim:

1. In combination, a machine having a rotary cutter, a shaft-like support member on said machine and having a free end positioned adjacent an edge of said rotary cutter, a reduced portion on said end of said shaft, said reduced portion having a threaded bore therein and substantially transverse the plane of said rotary cutter, a threaded member threadedly engaged said threaded bore, and a bracket pivotally mounted on said threaded member, said bracket having a portion thereof engaging the end of said shaft to prevent movement of said bracket about said threaded member, said bracket supporting an assemblage of kickback dogs and a splitter blade, whereby rotation of said threaded member will move said bracket laterally with respect to the plane of said rotary cutter and transversely of the longitudinal axis of said shaft whereby said splitter blade and kickback dog assemblage may be supported on said shaft and said splitter blade adjusted transversely for alignment with the plane of said rotary cutter.

2. In combination, a machine having a rotary cutter, a shaft-like support member adjustably secured on said machine and having a free end positioned adjacent an edge of said rotary cutter, a reduced portion on said end of said shaft, said reduced portion having a threaded bore therein transverse the plane of the rotary cutter, a threaded member threadedly engaging said threaded bore, and a bracket pivotally mounted on said threaded member, said bracket having a portion thereof engaging the end of said shaft to prevent movement of said bracket about said threaded member, said bracket supporting an assemblage of kickback dogs and a splitter blade, whereby rotation of said threaded member will move said bracket transversely of the longitudinal axis of said shaft whereby said splitter blade and kickback dog assemblage may be supported on said shaft and adjusted transversely relative thereto.

3. In combination, a machine having a rotary cutter, a shaft attached to a part of the machine and extending a free end to a point adjacent an edge of said rotary cutter, a bracket having two forked supporting members and a cross bar, a pin supported by one of said forked supporting members, an assemblage of kickback dogs and a splitter blade pivotally mounted on said pin, said splitter blade having a lug engaging said cross bar to prevent rotation of said splitter blade about said pin, said kickback dogs having at least one extension to engage said cross bar to limit the degree of rotative movement of said kickback dogs about said pin, a threaded screw rotatably supported in the other of said forked supporting members of said supporting bracket, said shaft having a transverse threaded bore formed through said free end, said threaded screw engaging said threaded bore and the free end of said shaft having a portion engaging said cross bar of said bracket to prevent rotation of said bracket about said threaded screw relative to said shaft whereby rotation of said threaded screw will adjustably move said bracket and said kickback dog and splitter blade assembly transversely relative to said shaft.

4. In combination, a machine having a rotary cutter rotating in substantially one plane, an arcuate guard attached to a part of the machine and shielding a portion of the cutter, a support member having a free end adjacent said rotary cutter and secured on said guard, a unitary bracket, a shaft journaled in said bracket and having a threaded portion engaging the free end of said support member and having the long axis of said shaft transverse the plane of said cutter, said bracket supporting kickback dogs and a splitter blade whereby rotation of said threaded shaft will adjust said bracket transverse the plane of said rotary cutter.

5. In combination with a machine having a rotary cutting member rotating in a given plane, a member suitable for attachment to said machine adjacent said cutting member, said member having a lug, said lug having a threaded hole formed therein transverse to the plane of said cutting member, a bracket, said bracket carrying a kickback dog and a splitter blade assemblage, a threaded member rotatably supported in said bracket and threadedly engaging said transverse threaded hole formed in said lug, and means on said lug to engage said bracket to prevent rotational movement of said bracket about said threaded member, said threaded member being constructed and arranged to move said bracket relative to and transverse to said lug on rotation of said member.

6. In combination, a machine having a rotary cutter rotating in a given plane, an arcuate guard attached to a part of the machine and covering a portion of said cutter, a shaft attached to said guard and extending adjacent an edge of said cutter, said shaft having a transverse bore formed therein adjacent said cutter and transverse said given plane, a bracket having a splitter blade operatively mounted thereon, an elongated member on said bracket engaging said bore to secure said bracket to said bore and means to secure said elongated member in selected adjusted positions along said bore, said bracket being thereby adjustable transversely to said shaft.

References Cited in the file of this patent

UNITED STATES PATENTS

| | | |
|---|---|---|
| 615,883 | Fisher | Dec. 13, 1898 |
| 1,207,683 | Coyle | Dec. 5, 1916 |
| 1,526,128 | Flohr | Feb. 10, 1925 |
| 1,888,679 | Knapp | Nov. 22, 1932 |
| 2,257,459 | Gardner | Sept. 30, 1941 |
| 2,479,998 | Bunkovsky | Aug. 23, 1949 |
| 2,562,396 | Schutz | July 31, 1951 |